US012569885B2

(12) United States Patent
Wesin et al.

(10) Patent No.: US 12,569,885 B2
(45) Date of Patent: Mar. 10, 2026

(54) POWER PLANT BOILER SAND COMPRISING DISCARDED FOUNDRY SAND, USE OF POWER PLANT BOILER SAND, METHOD FOR PRODUCING POWER PLANT BOILER SAND AND APPARATUS FOR PRODUCING POWER PLANT BOILER SAND

(71) Applicant: RESAND OY, Nuutajärvi (FI)

(72) Inventors: Toni Wesin, Nuutajärvi (FI); Jukka Nieminen, Nuutajärvi (FI)

(73) Assignee: RESAND OY, Nuutajärvi (FI)

( * ) Notice: Subject to any disclaimer, the term of this patent is extended or adjusted under 35 U.S.C. 154(b) by 887 days.

(21) Appl. No.: 17/605,115

(22) PCT Filed: Apr. 24, 2020

(86) PCT No.: PCT/FI2020/050271
§ 371 (c)(1),
(2) Date: Oct. 20, 2021

(87) PCT Pub. No.: WO2020/216998
PCT Pub. Date: Oct. 29, 2020

(65) Prior Publication Data
US 2022/0203404 A1     Jun. 30, 2022

(30) Foreign Application Priority Data
Apr. 24, 2019     (FI) ...................................... 20195329

(51) Int. Cl.
*B07B 13/04*          (2006.01)
*B07B 1/00*           (2006.01)
(Continued)

(52) U.S. Cl.
CPC ................ *B07B 13/04* (2013.01); *B07B 1/00* (2013.01); *B07B 4/00* (2013.01); *B09B 3/30* (2022.01)

(58) Field of Classification Search
CPC ..... Y10T 428/2991; B22C 1/181; B09B 3/00; B09B 3/20; B09B 3/25; B09B 5/00; B09B 2101/30
See application file for complete search history.

(56) References Cited

U.S. PATENT DOCUMENTS 3,429,719 A     2/1969   Manley
3,764,078 A     10/1973  Richard
(Continued)

FOREIGN PATENT DOCUMENTS

CN     101780522     7/2010
CN     103128228     6/2013
(Continued)

OTHER PUBLICATIONS

Gedik et al., Utilization of waste foundry sand (WFS) as impermeable layer (drainage blanket) for pavement structures, Advances in Transportation Geotechnics—Ellis, Yu, McDowell, Dawson & Thom (eds) © 2008 Taylor & Francis Group, London, ISBN 978-0-415-47590-7 (Year: 2008).*

(Continued)

*Primary Examiner* — Hoa (Holly) Le
(74) *Attorney, Agent, or Firm* — Nixon & Vanderhye PC

(57) ABSTRACT
Power plant boiler sand comprising a clay-based binder film (3) on the surface of a grain of sand (2). In addition, a method and apparatus for producing power plant boiler sand.

26 Claims, 1 Drawing Sheet

(51) Int. Cl.
    *B07B 4/00*             (2006.01)
    *B09B 3/30*             (2022.01)

(56)             References Cited

U.S. PATENT DOCUMENTS

| | | | | |
|---|---|---|---|---|
| 4,274,360 A | * | 6/1981 | Hofmann | B22C 5/10 |
| | | | | 241/DIG. 10 |
| 4,354,641 A | | 10/1982 | Smith | |
| 4,436,618 A | * | 3/1984 | Rigby | B01D 12/00 |
| | | | | 210/729 |
| 4,491,277 A | * | 1/1985 | Bauer | B22C 5/18 |
| | | | | 241/23 |
| 4,700,766 A | * | 10/1987 | Godderidge | B22C 5/18 |
| | | | | 164/412 |
| 4,709,862 A | | 12/1987 | Leidel | |
| 6,162,164 A | * | 12/2000 | Lorraine | B09B 3/20 |
| | | | | 588/257 |
| 2004/0244943 A1 | | 12/2004 | Eisenhour | |
| 2010/0173767 A1 | * | 7/2010 | Koch | B22C 5/06 |
| | | | | 501/133 |
| 2023/0415167 A1 | * | 12/2023 | Nieminen | B22C 5/06 |

FOREIGN PATENT DOCUMENTS

| | | | | |
|---|---|---|---|---|
| JP | 4 215921 | | 1/2009 | |
| KR | 100380552 B1 | * | 9/2003 | |
| RU | 2583794 C1 | * | 5/2016 | B03B 9/04 |
| RU | 2667940 C1 | * | 9/2018 | |
| WO | 02/04367 | | 1/2002 | |
| WO | WO-2017134016 A1 | * | 8/2017 | F23C 10/002 |
| WO | WO-2017174873 A1 | * | 10/2017 | B09B 3/00 |

OTHER PUBLICATIONS

Wooldridge et al., Biofilm origin of clay-coated sand grains, Geology, Oct. 2017; v. 45; No. 10; p. 875-878 (Year: 2017).*

Schone et al., "Economic and ecological aspects of the internal and external recycling of used foundry sand", Environment Protection Engineering, vol. 25, No. 3, 23-36, 1999 (Year: 1999).*

Park et al., The regeneration of waste foundry sand and residue stabilization using coal refuse, Journal of Hazardous Materials 203-204 (2012) 176-182 (Year: 2012).*

Resand, Power Plant Waste Sands for the Construction Industry, Feb. 11, 2020 (Year: 2020).*

Translation of KR 100380552 B1 (Year: 2003).*

"Boiler Tube Size Chart" by Union Steel (Year: 2024).*

"Power Plant Waste Sands for the Construction Industry" by Resand (Year: 2010).*

Schone et al., "Economic and ecological aspects of the internal and external recycling of used foundry sand", Environment Protection Engineering, No. 3, vol. 25 (Year: 1999).*

Schlipf et al., Using sand and other small grained materials as heat storage medium in a packed bed HTTESS, Energy Procedia 69 ( 2015 ) 1029-1038 (Year: 2015).*

Almendros-Ibáñez et al., A review of solar thermal energy storage in beds of particles: Packed and fluidized beds, Solar Energy 192 (2019) 193-237 (Year: 2019).*

International Search Report for PCT/FI2020/050271 mailed Sep. 21, 2020, 5 pages.

Written Opinion of the ISA for PCT/FI2020/050271 mailed Sep. 21, 2020, 6 pages.

FI Search Report for FI20195329 mailed Dec. 2, 2019, 2 pages.

FI Office Action for FI20195329 dated Nov. 5, 2020, 5 pages.

* cited by examiner

POWER PLANT BOILER SAND COMPRISING DISCARDED FOUNDRY SAND, USE OF POWER PLANT BOILER SAND, METHOD FOR PRODUCING POWER PLANT BOILER SAND AND APPARATUS FOR PRODUCING POWER PLANT BOILER SAND

This application is the U.S. national phase of International Application No. PCT/FI2020/050271 filed Apr. 24, 2020 which designated the U.S. and claims priority to FI patent application Ser. No. 20/195,329 filed Apr. 24, 2019, the entire contents of each of which are hereby incorporated by reference.

BACKGROUND OF THE INVENTION

The invention relates to power plant boiler sand which forms a combustion grate at power plants.

The invention further relates to a method and apparatus for producing power plant boiler sand and to using power plant boiler sand.

Power plant boiler sand is used at power plants to form a combustion grate. The purposes of the sand is to form a sand layer, in other words, a bed where the burning of the fuel which is fed in the boiler takes place. Typical power plant boilers of this kind include circulating fluidised bed and fluidised bed boilers.

The power plant boiler sand used in power plant boilers is typically bed sand made of natural sand, whereby the fraction which is suitable as bed sand in its particle size, is collected from natural sand as bed sand. When burning biofuels having a high alkali content, in particular, a problem that emerges is the reaction between the silica in natural sand and the compounds of alkalis in the ash of biofuel, which causes sintering of the sand even at low temperatures. The reaction between silica and alkalis then forms a mixture, which causes the grains of sand to stick together, as a result of which the floating of the bed material becomes weaker or even stops entirely, resulting in the need to replace the bed material with new.

A solution set forth to the above problem is the use of bed material made of furnace slag. Bed material made of furnace slag is characterised by a very low silica content, typically less than 10%. As a result, the alkali reactions taking place on the surfaces of the grains of sand are lesser than when natural sand is used, whereby the sintering of bed material made of furnace slag is lesser than when natural sand is used. Consequently, bed material made of furnace slag need not be replaced with new material as often as bed material of natural sand.

However, the use of furnace slag as bed material causes a problem in that furnace slag that is quickly pre-cooled with water is in amorphous form and includes incrystallized energy which is released at approximately 860° C. The crystallization heat temporarily raises the bed temperature intensely, exceeding one thousand degrees which may present a risk if the bed temperature stays below the aforementioned 860° C. for long. In such a case, new incrystallized energy may enter the bed in connection with charging new furnace slag, which is not released immediately at the time it is added in the bed, but accumulates and when it is released increases the bed temperatures to such a high level that the entire bed may be sintered in one go.

BRIEF DESCRIPTION OF THE INVENTION

It is object of the invention to establish new type of power plant boiler sand as well as a method and apparatus for its manufacture.

The solution according to the invention is characterized by what is disclosed in the independent claims.

The invention is based on there being a clay-based binder film on the surface of a grain of sand, preventing the reaction between the silica in the grain of sand and the compounds of alkalis present in particular in the ash of biofuels, or at least weakening it.

A benefit of the invention is that as the reaction between the silica in the grain of sand and the compounds of alkalis in particular in the ash of biofuels is prevented of at least weakened, sand sintering does not take place, or at least it is lesser than previously, thus extending the working life of power plant boiler sand.

According to an embodiment, power plant boiler sand is discarded foundry sand comprising clay-based binder.

According to a second embodiment, power plant boiler sand is discarded foundry sand comprising clay-based binder and from which the fine fraction has been separated.

Some other embodiments of the invention are disclosed in the dependent claims.

BRIEF DESCRIPTION OF THE DRAWINGS

The invention is now described in closer detail in connection with preferred embodiments and with reference to the accompanying drawings, in which.

For reasons of clarity, some embodiments of the invention are illustrated in the figures in a simplified form. In the figures, like reference numerals identify like elements.

DETAILED DESCRIPTION OF THE INVENTION

Figures 1, 2:
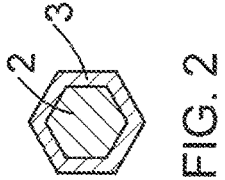
FIG. 1 is schematic presentation of a method and apparatus for producing power plant boiler sand.
FIG. 2 shows schematically a grain of sand and a clay-based binder film on it in cross section.

FIG. 1 is a schematic view of a production process formed by an apparatus 1 for producing power plant boiler sand. In this specification, power plant boiler sand may below also be simply referred to as boiler sand. In the embodiment according to FIG. 1, power plant boiler sand is made from discarded foundry sand comprising clay-based binder, whereby there is, as schematically shown in FIG. 2, on the surface of the grain of sand 2 of foundry sand, a clay-based binder film 3 by means of which a mould made of sand may be hardened. Said binder film 3 is typically of bentonite, but instead of bentonite said binder film 3 may also be of another clay-based binder, such as kaolinite. It has been established that the clay-based binder film 3 on the surface of the grain of sand 2 prevents the reaction between the silica in the grain of sand and the compounds of alkalis present in particular in the ash of biofuels, or at least reduces it, and therefore prevents the sintering of sand, or at least decreases it, discarded foundry sand containing clay-based binder is well suited for use as boiler sand.

The apparatus 1 of FIG. 1 comprises a feeder hopper 4 or another feeder member, by means of which foundry sand may either continuously or periodically be fed to a conveyor 5 as schematically shown by the arrow F4. The conveyor 5 may be a belt conveyor, for example. The conveyor 5 is used to feed foundry sand forward in the production process of boiler sand. The operation of the conveyor 5, that is, stopping, starting, and speed, may be controlled with a motor driving the conveyor 5, but not shown in FIG. 1 for reasons of clarity. The operation of said motor may in turn be controlled by means of at least one control unit 6 included in the apparatus 1, by means of a control signal CO5.

The apparatus 1 may additionally comprise a shaker 7 which is arranged in connection with the conveyor 5 and by means of which the belt of the conveyor 5 may be shaken to break gobs or lumps of sand that are potentially present in the foundry sand supplied to the conveyor 5. The operation of the shaker 7 may be controlled with the control unit 6, for example, by means of a control signal CO7.

The apparatus shown in FIG. 1 further includes a screen section 8 to break and/or remove the fine fraction such as dust in the foundry sand, and the gobs and lumps of sand possibly still in the foundry sand. The screen section 8 such as the one shown in FIG. 1 comprises a first mesh 8*a* and a second mesh 8*b* which are provided with shakers 9*a*, 9*b* by means of which the meshes 8*a*, 8*b* may be shaken. In the direction of travel of the foundry sand, so from left to right in FIG. 1, the meshes 8*a*, 8*b* are adapted in the substantially horizontal direction successively and staggered downwards in relation to each other so that in the vertical direction the second mesh 8*b* may be located below the first mesh 8*a* at least to some extent. The meshes 8*a*, 8*b* may be tilted down to an angle of 0 to 15 degrees, for example, in the direction of travel of the foundry sand so that the beginning of the meshes 8*a*, 8*b*, that is, the end directed towards the feed of the foundry sand, is higher than the end of the meshes 8*a*, 8*b*, so the end directed towards the direction of travel of the foundry sand. In such a case, when the meshes 8*a*, 8*b* are shaken, the sand not filtered through the mesh 8*a*, 8*b* travels forward from left to right under gravity. Said angle may advantageously be 5 degrees. The tilting of the meshes 8*a*, 8*b* and the operation of the shakers 9*a*, 9*b* may be controlled with the control unit 6 by means of control signals CO8*a*, CO8*b*. The screen section 8 may be partitioned separate from other apparatus of the production process by wall and/or roof structures, or each mesh 8*a*, 8*b* may be separately encased. Said wall and roof structures or enclosures are not shown in the drawing for reasons of clarity.

As schematically shown by the arrow F, the foundry sand is fed from the conveyor 5 onto the first mesh 8*a*. When the shaker 9*a* is shaking the first mesh 8*a*, the foundry sand moves forwards on the first mesh 8*a*. At the same time, as defined by the mesh size of the first mesh 8*a*, at least a portion of the foundry sand is separated from the foundry sand and is filtered through the first mesh 8*a* as schematically shown by the arrow P8*a*. The mesh size of the first mesh 8*a* is so selected that grains of sand smaller than a determined grain size are separated from the foundry sand by the first mesh 8*a*. The separating portion in question comprises at least dust and may also comprise other fine fraction mixed in the foundry sand. Below the first mesh 8*a*, at least one first suction machine 10 is arranged to suck out of the process such material that passed through the first mesh 8*a*. In addition, at least part of the dust or other fine fraction coming off the foundry sand during shaking may be also sucked out of the process as schematically shown by the arrow S8*a* by means of at least one second suction machine 11 also arranged over the meshes 8*a*, 8*b*. The operation of said at least one first suction machine 10 and at least one second suction machine 11, such as switching on and off or suction force, may be controlled for example with the control unit 6 by means of the corresponding control signals CO10, CO11.

The portion of the foundry sand which was fed to the first mesh 8*a* and did not pass through the first mesh 8*a* and did not end up in said at least second suction machine 11, either, moves from the first mesh 8*a* to the second mesh 8*b* as schematically shown by the arrow F8*b*. The mesh size of the second mesh 8*b* is so selected that it passes, or separates, all the grains of sand smaller than the mesh size in question from the foundry sand into its own fraction as schematically shown by the arrow P8*b*. The portion of the foundry sand, which ended up in a first collecting tray 12 as indicated by the arrow P8*b*, forms a so-called fraction suitable for end use, that is, accepted as boiler sand. The dust or other fine fraction still coming off the foundry sand on the second mesh 8*b* during shaking may be sucked out of the process as schematically shown by the arrow S8*b* by means of at least one second suction machine 11 arranged over the meshes 8*a*, 8*b*.

The portion of the foundry sand, which was fed on the second mesh 8*b* and did not pass through the second mesh 8*b*, either, ends up in a second collecting tray 13 as schematically shown by the arrow F13. This portion of the foundry sand comprises such gobs or lumps of sand that have not broken on the conveyor 5 or meshes 8*a*, 8*b*, as well as the grains larger than the mesh size of the second mesh 8*b*. The portion of the foundry sand, which ended up in the second collecting tray 13, is sent on for further processing.

The mesh size of the meshes 8*a*, 8*b* is selected according to the use of the accepted fraction that is separated into the first collecting tray 12, in other words, meant as power plant boiler sand. Typical uses of power plant boiler sand include circulating fluidised bed boilers and fluidised bed boilers which differ from each other in the grain size of the boiler sand.

The grain size of the boiler sand used in circulating fluidised bed boilers is typically approximately 0.05 to 1 mm, advantageously approximately 0.1 to 0.5 mm. When producing boiler sand suitable for use in a circulating fluidised bed boiler from foundry sand as described in the above, the mesh size of the first mesh 8*a* may be selected to be, for example, approximately 0.05 mm, advantageously approximately 0.1 mm. In this case, all the material of the grain size of no more than approximately 0.05 mm or no more than approximately 0.1 mm, such as dust, is separated by the first mesh 8*a* off the foundry sand ended up on the mesh 8*a* and sucked with at least one suction machine 10, 11 out of the production process. The mesh size of the second mesh 8*b* may for its part selected to be approximately 1 mm, advantageously approximately 0.5 mm. In this case, all the fraction of the grain size of no more than approximately 1.0 mm or advantageously no more than approximately 0.5 mm ended up on the second mesh 8*b* is separated by the second mesh 8*b* off the foundry sand ended up on the second mesh 8*b*. The fraction separated by the second mesh 8*b* ends up in the first collecting tray 12 and establishes accepted fraction that is suitable for use as boiler sand in circulating fluidised bed boilers. The portion of the foundry sand, which has not passed through the meshes 8*a*, 8*b* or did not end up in at least one second suction machine 11 arranged over the meshes 8*a*, 8*b*, ends up in the second collecting tray 13 and is sent on for further processing.

The grain size of the boiler sand used in fluidised bed boilers is typically approximately 0.5 to 2 mm. When producing boiler sand suitable for use in a fluidised bed boiler from foundry sand as described in the above, the mesh size of the first mesh 8*a* may be selected to be, for example, approximately 0.5 mm. In this case, all the material of the grain size of no more than approximately 0.5 mm is separated by the first mesh 8*a* off the foundry sand ended up on the mesh 8*a* and sucked with at least one suction machine 10, 11 out of the production process. The mesh size of the second mesh 8*b* may for its part be selected to be no more than approximately 2 mm. In this case, all the fraction of the grain size of no more than approximately 2 mm is separated by the second mesh 8*b* off the foundry sand ended up on the second mesh 8*b*. The fraction separated by the second mesh 8*b* ends up in the first collecting tray 12 and establishes an accepted fraction that is suitable for use as boiler sand in fluidised bed boilers. The portion of the foundry sand, which has not passed through the meshes 8*a*, 8*b* or did not end up in at least one second suction machine 11 arranged over the meshes 8*a*, 8*b*, ends up in the second collecting tray 13 and is sent on for further processing.

By using foundry sand having clay-based binder on the surface of its grains and removed from service in a foundry for the manufacture of boiler sand, boiler sand may be manufactured from material that would otherwise be classified as waste. Because the clay-based binder film 3 on the surface of the grain of sand 2 prevents the reaction between the silica in the grain of sand and the compounds of alkalis present in particular in the ash of biofuels, or at least reduces it, and therefore prevents the sintering of sand, or at least decreases it, with the solution disclosed in the above boiler sand is achieved that is suitable for use in power plant boilers, and which need not be replaced with new sand as often as bed material of natural sand. Consequently, with the disclosed solution, at least a fraction of foundry sand may still be recycled as boiler sand before the sand fraction in question need to be delivered for cleaning. In addition, discarded foundry sand is air-cooled and therefore in crystallized form to begin with, whereby crystallization heat is no longer released, which further reduces the risk of the bed material of a power plant boiler sintering.

In addition to the sand that was part of a mould, discarded foundry sand also refers to sand comprising clay-based binder and meant for foundry sand use, from which the fine fraction will be or has been removed, but which sand portion has not at any stage ended up as part of the mould, but is, for example, excess sand from the manufacture of the mould.

According to an embodiment, the screen section 8 may comprise three meshes in the direction of travel of the foundry sand, in the substantially horizontal direction successively and staggered downwards in relation to each other so that in the direction of travel of the foundry sand the last two meshes may be located below the preceding mesh at least to some extent. In such a case, the first mesh in the direction of travel of the foundry sand may be used to separate the fine fraction from the flow of foundry sand, the second mesh may be used to separate the fraction suitable for use in a circulating fluidised bed boiler from the flow of foundry sand, and the third mesh may be used to separate the fraction suitable for use in a fluidised bed boiler from the flow of foundry sand.

According to a second embodiment, the power plant boiler sand according to the invention may be manufactured by screening from natural sand the fraction appropriate for a particular boiler type, as concerns the grain size, and by coating the grains of sand of the fraction in question by clay-based binder, such as bentonite. Said coating of grains of sand may be implemented by mixing sand and clay-based binder with each other, or by forcing clay-based binder on the surface of the grain of sand by rolling, for example.

Those skilled in the art will find it obvious that, as technology advances, the basic idea of the invention may be implemented in many different ways. The invention and its embodiments are thus not restricted to the above-described examples but may vary within the scope of the claims.

The invention claimed is:

1. Power plant boiler sand comprising a clay-based binder film on the surface of a grain of sand, wherein the power plant boiler sand is formed from air- cooled discarded foundry sand comprising clay-based binder and from which a fine fraction has been separated, the fine fraction being a sand portion in a predetermined size range.

2. The power plant boiler sand as claimed in claim 1, wherein the clay-based binder film is of bentonite.

3. The power plant boiler sand as claimed in claim 1, wherein the discarded foundry sand is used in a circulating fluidized bed boiler or in a fluidized bed boiler.

4. The power plant boiler sand as claimed in claim 1, wherein:

the discarded foundry sand is used in a circulating fluidized bed boiler, and wherein the grain size is 0.05-1 mm.

5. A method of using discarded foundry sand comprising clay-based binder, the method comprising applying the discarded foundry sand as power plant boiler sand, wherein the discarded foundry sand is air cooled, and wherein a fine fraction is separated from the discarded foundry sand prior to the discarded foundry sand being applied as the power plant boiler sand, the fine fraction being a sand portion with a predetermined size range, the power plant boiler sand having a clay-based binder film.

6. The method as claimed in claim 5, wherein the discarded foundry sand is used as a bed material in forming a combustion grate at a power plant.

7. The method as claimed in claim 5, wherein the discarded foundry sand is used in a fluidized bed boiler.

8. The method as claimed in claim 7, wherein grain size of the discarded foundry sand used with the fluidized bed boiler is 0.5-2 mm.

9. The method as claimed in claim 5, wherein the applying includes using the discarded foundry sand in forming a mold.

10. The method as claimed in claim 5, wherein the clay-based binder film is of bentonite.

11. The method as claimed in claim 5, wherein the discarded foundry sand is used in a circulating fluidized bed boiler or in a fluidized bed boiler.

12. The method as claimed in claim 11, wherein:

the discarded foundry sand is used in a circulating fluidized bed boiler, and wherein the grain size is 0.05-1 mm.

13. The method as claimed in claim 5, wherein the discarded foundry sand is used in a circulating fluidized bed boiler.

14. The method as claimed in claim 13, wherein grain size of the discarded foundry sand is selected based on the circulating fluidized bed boiler in which it is to be used.

15. The method as claimed in claim 13, wherein the grain size is 0.05-1 mm.

16. The method as claimed in claim 15, wherein the grain size is 0.1-0.5 mm.

17. A method of making power plant boiler sand, the method comprising:

receiving discarded foundry sand comprising a clay-based binder;

air cooling the discarded foundry sand;

separating a fine fraction from the discarded foundry sand, the fine fraction being a sand portion with a predetermined size range; and providing the air-cooled discarded foundry sand with the fine fraction removed therefrom for use as the power plant boiler sand, the power plant boiler sand including a clay-based binder film from the clay-based binder in the discarded foundry sand.

18. The method as claimed in claim 17, wherein the discarded foundry sand is used as a bed material in forming a combustion grate at a power plant.

19. The method as claimed in claim 17, wherein the discarded foundry sand is used in a circulating fluidized bed boiler.

20. The method as claimed in claim 19, wherein grain size of the discarded foundry sand is selected based on the circulating fluidized bed boiler in which it is to be used.

21. The method as claimed in claim 19, wherein the grain size is 0.05-1 mm.

22. The method as claimed in claim 21, wherein the grain size is 0.1-0.5 mm.

23. The method as claimed in claim 17, wherein the discarded foundry sand is used in a fluidized bed boiler.

24. The method as claimed in claim 23, wherein grain size of the discarded foundry sand used with the fluidized bed boiler is 0.5-2 mm.

25. The method as claimed in claim 17, wherein the discarded foundry sand is used in forming a mold.

26. The method as claimed in claim 17, wherein the clay-based binder film is of bentonite.

\* \* \* \* \*